INVENTOR.
John G. Kay
BY
Grant J. Baldwin
Attorney

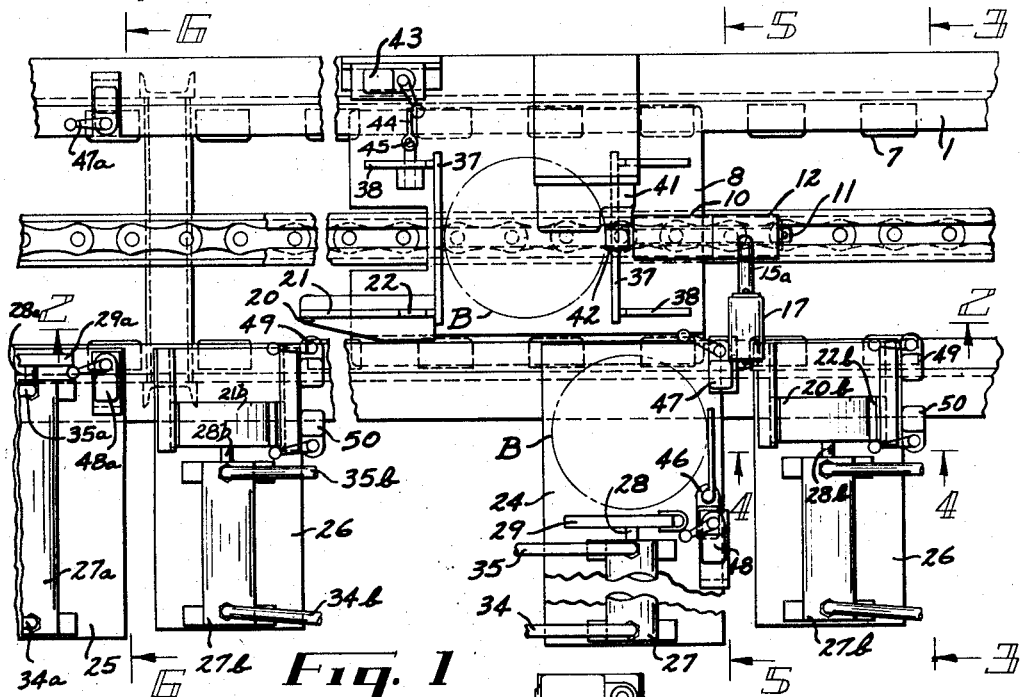

United States Patent Office 2,893,535
Patented July 7, 1959

2,893,535

FREE PALLET CONVEYORS

John G. Kay, Detroit, Mich., assignor to F. Jos. Lamb Company, Warren Township, county of Macomb, Mich., a corporation of Michigan Application April 26, 1957, Serial No. 660,436

7 Claims. (Cl. 198—21)

This invention relates to improvements in free pallet conveyors. It is an object of the invention to provide a simple form of free pallet conveyor wherein latches are pivoted longitudinally on pallets for movement into and out of engagement with carriers projecting at spaced intervals from a continuously moving chain; and wherein a cam plate movable relative to an approaching pallet is adapted to move the latch thereon out of the path of movement of the carriers.

Another object of the invention is to provide such a free pallet conveyor wherein the cam plate is mounted for movement transversely of the conveyor into position to actuate the latch on a pallet, and wherein the latch is so moved by the pallet as it approaches the cam plate.

A further object of the invention is to provide a free pallet conveyor having loading and unloading platforms projecting laterally outward from the conveyor frame and cam plates mounted adjacent the platforms for movement transversely of the frame; and wherein means operating in timed sequence and actuated by an approaching pallet move the cam plate to stop the pallet; move either a pusher plate on a loading platform to push a workpiece off the platform onto the stopped pallet, or a pusher plate mounted on an unloading platform across the stopped pallet to unload a workpiece therefrom; and return the pusher plate and then the cam plate to their initial positions.

Having thus briefly stated some of the objects of the invention I will now describe it in detail with the aid of the accompanying drawings, in which:

Figure 1 is a plan view of the invention.

Figures 2, 3, 4, 5 and 6 are sections on the lines 2—2, 3—3, 4—4, 5—5 and 6—6, respectively, of Figure 1.

Figure 6:
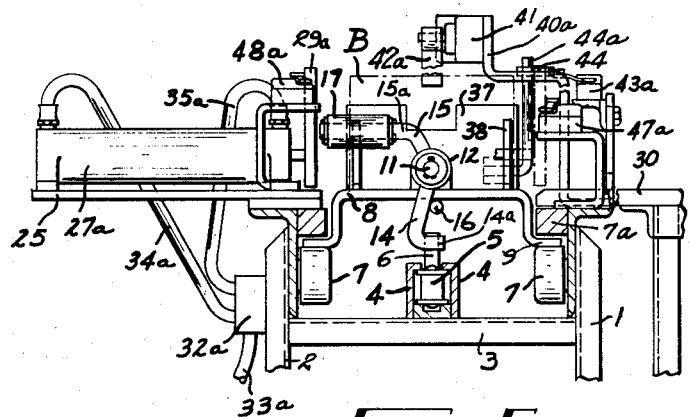
Figure 5:
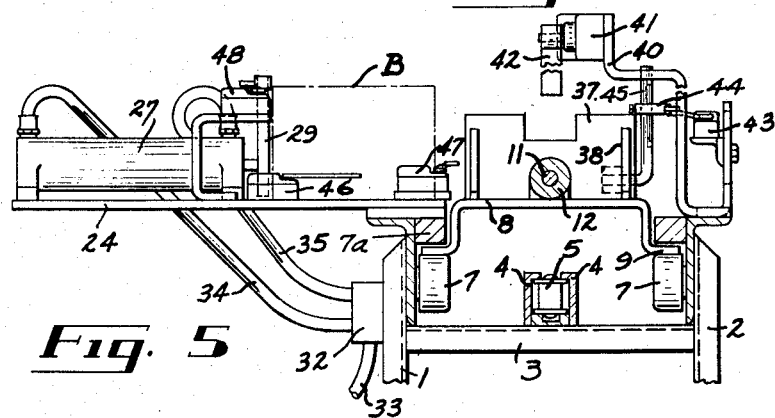

Referring to Figures 1 to 6, inclusive, 1 designates a conveyor having a frame including two parallel rows of uprights 2 arranged in opposed pairs. Extending between and secured at their extremities to each opposed pair of uprights is a brace 3. Secured longitudinally upon the braces 3 are spaced parallel guides 4 upon and between which an endless conveyor chain 5 (which may be driven in any conventional manner, not shown) is adapted to travel. Rigidly secured to and projecting upwardly from the chain at spaced intervals therealong are carriers or pins 6. Suitably supported on the uprights 2 are uniformly spaced tracks 7, of any conventional form parallel with the guides 4; each track in this instance consists of a plurality of rollers mounted in radially spaced relation to one another. Pallets 8 have laterally projecting flanges 9 extending outwardly from opposite sides which are adapted to slide along the rollers forming the tracks. Mounted upon the frame above each of the tracks 7 and vertically spaced therewith is a pallet locking bar 7a. These bars extend over the outer edges of the pallets to prevent the latter from being knocked off the frames due to a sudden jolt such as might result from movement of a pusher plate or the like.

I will now describe one of the pallets 8 which are all identical. A mounting 10 is secured, usually by welding, on the front of the pallet to support a pin 11 above and in vertical alignment with the chain 5. The pin extends forwardly beyond the pallet and has a bushing 12 rotatably mounted thereon. Extending substantially radially from and integral with the bushing are a latch 14 and a lever 15. The rotary position of the bushing 12 is normally such that the latch extends substantially vertically downward to rest against a fixed stop 16 which is welded or otherwise suitably secured to the pallet and projects forwardly therefrom above the path of movement of the carriers 6. The outer extremity 14a of the latch is flexed substantially circularly relative to the axis of the bushing and extends across the path of movement of the carriers to engage one of the latter so that the pallet is advanced along its tracks 7 by the chain 5. Then the lever 15 is upwardly and outwardly inclined from the bushing 12 with its outer extremity 15a, which is flexed, extending substantially horizontally outward over one side of the conveyor. Rotatably mounted on the lever extremity 15a is a roller 17.

Secured on each pallet and projecting longitudinally and rearwardly therefrom is a cam plate 20 having a forwardly and upwardly inclined camming face 21 thereon in which a depressed seat 22 is formed towards its front extremity. The camming face on each pallet, when the pallet is stationary, is adapted to be engaged by a roller 17 on a following pallet. When this happens the roller on the following pallet rides up the camming face 21 of the pallet ahead and drops into the seat 22 thereon. During its travel up the camming face the roller is turned to its upwardly and outwardly inclined position indicated at 17' thereby turning its bushing 12 about its axis and moving the latch thereon to its carrier disengaging position 14'. Then the following pallet remains stationary as the chain continues its travel. However as soon as the pallet ahead has resumed its travel sufficiently for the roller on the rearward pallet to reassume its normal position the latch on the rear pallet is returned to its carrier engaging position, due to the fact that the weight of the lever 15 and its roller 17 at all times tends to turn the bushing 12 so that the latch 14 rests against the stop 16.

Extending laterally from the frame of the conveyor and suitably secured thereto at predetermined intervals therealong are loading platforms 24, unloading platforms 25 and cam plate platforms 26, one of which latter is provided in front of each loading and unloading platform. Secured on each loading platform and extending at right angles to the path of movement of the conveyor is a cylinder 27 having a piston therein from which a piston rod 28 projects toward the conveyor. Suitably mounted on the platform 24 for reciprocation by the piston rod 28 is a pusher plate 29, which when the piston rod is at its inward limit of travel, is sufficiently spaced from a pallet when the latter is positioned opposite to it for a workpiece to be placed upon the platform adjacent but clear of the pallet for delivery thereonto by the pusher plate.

Similarly secured on the unloading platform 25 is a cylinder 27a having a piston therein from which a piston rod 28a extends to move a pusher plate 29a thereon across a pallet 8 when positioned opposite to it. However in this instance the pusher plate rests clear of but adjacent the pallet to be unloaded when the piston rod is at the inner extremity of its stroke, so that upon movement of the rod a workpiece is forced off the pallet onto a suitable rack 30 on the opposite side of the conveyor.

Each cam platform 26 has a cylinder 27b secured thereon at right angles to the conveyor, and secured on the piston rod 28b projecting from the cylinder is a cam plate 20b mounted for sliding movement across the platform. The cam plate 20b is similar to the cam plate 20 above described and has a camming face 21b with a depressed seat 22b formed therein adjacent its forwardly and upwardly inclined extremity. The cam plate 20b is normally outwardly positioned relative to passing pallets so that they may freely pass. However when the piston rod 28b is thrust outwardly relative to its cylinder the cam plate is moved into the path of an approaching pallet, and more particularly into the path of the roller 17 thereon. The roller on the approaching pallet rides up the camming face 21b and turns its bushing 12 so that the latch 14 thereon releases the carrier 6 by which it was being advanced. Upon inward movement of the piston 28b relative to its cylinder the cam plate is moved laterally from the pallet so that the roller 17 is released and drops back to its normal position thereby moving the latch 14 into contact with its stop 16.

Suitably secured to the conveyor adjacent each platform 24, 25 and 26 is a spring return solenoid operated control valve 32, 32a and 32b to each of which a suitable fluid pressure line 33, 33a and 33b, respectively is connected. The lines 33, 33a and 33b are also connected to a source of fluid under pressure such as compressed air, though it is of course understood that the valves may be for hydraulic fluid if desired. Extending from each valve 32, 32a and 32b are other lines 34 and 35, 34a and 35a, and 34b and 35b, connected to the inner and outer extremities of the cylinders 27, 27a and 27b, respectively.

Mounted on each pallet 8 adjacent opposite extremities are transverse guard plates 37 between which a workpiece B is adapted to be loaded thereon, and projecting outward from the plates 37 are ribs 38.

Extending upwardly from the frame of the conveyor adjacent each loading platform 24 is a support 40 having a limit switch 41 mounted thereon. Depending from each switch 41 and forming part thereof is an arm 42 which is adapted to be tripped by a workpiece B passing on one of the pallets. Secured also on the frame of the conveyor adjacent each loading platform is a vertically adjustable limit switch 43 which is adapted to be actuated by a trip 44 mounted for vertical adjustment on a post 45 secured to a rib 38 on each pallet. Thus selective means are provided whereby some of the switches 43 may be vertically positioned relative to some of the trips 44 to be actuated thereby.

Similarly adjacent each unloading platform 25 and mounted on the conveyor frame adjacent thereto is a support 40a for a limit switch 41a having a depending arm 42a which is adapted to be tripped by a workpiece on a passing pallet. Secured also on the conveyor frame adjacent each unloading platform is a vertically adjustable limit switch 43a mounted for vertical adjustment and adapted to be actuated by a trip 44 mounted for vertical adjustment on one of the pallets.

Mounted on each loading platform 24 is a limit switch 46 so located that it is actuated by a workpiece thereon properly positioned for loading onto a pallet. On each loading platform other limit switches 47 and 48 are also secured so that they are tripped by the pusher plate 29 when its piston 28 reaches its outward and inward limit of travel, respectively. On each unloading platform 25 is a limit switch 48a positioned to be actuated by the pusher plate 29a thereon when its piston rod 28a reaches the inner extremity of its stroke; and mounted on the far side of the conveyor frame opposite each unloading platform is a limit switch 47a adapted to be actuated by the pusher plate 29a when it has moved across a pallet and unloaded a workpiece therefrom at which time the piston rod 28a has reaches its outer limit of travel.

Mounted on each cam plate platform 26 are two limit switches 49 and 50. The limit switch 49 is positioned to be actuated by the cam plate 20b thereon when the latter is farthest from its cylinder 27b and in position to engage the roller on an approaching pallet, and the limit switch 50 is positioned to be actuated by the cam plate as the latter moves to its rearward position adjacent its cylinder.

Before describing the electrical circuits it is also pointed out that the limit switch 41 adjacent each loading platform is normally closed and is adapted to be opened by a workpiece on a passing pallet, as there would be no object in completing a circuit and stopping an already loaded pallet opposite a loading platform. However the limit switches 41a adjacent the unloading platforms are normally open and are adapted to be closed by passing workpieces.

From the above description and from the relay circuit shown in Figure 7 it will be noted that loading is accomplished in the following manner:

When the limit switch 46 on a platform 24 and the switch 41 adjacent thereto remains closed, and the switch 43 adjacent the platform is actuated, a circuit relay 51 energizes a solenoid 55 in the control valve 32b and the cam plate 20b is advanced into position to engage the roller 17 on an approaching pallet 8. When the cam plate reaches its forward limit of travel it actuates the limit switch 49 thereby cutting in a timer relay 52. This relay provides a time interval during which the roller is thrust upwardly by the cam plate and enters the depressed seat 22b thereon. Then movement of the pallet is arrested and the latter is positioned opposite a loading platform 24. The timer relay then energizes a circuit relay 53 by which the solenoid 54 in the control valve 32 is energized and fluid under pressure enters the cylinder 27 and advances the pusher plate 29 so that the workpiece on the loading platform is pushed onto the pallet opposite to it. Upon reaching the forward limit of its stroke the pusher plate actuates the limit switch 47 thereby releasing the solenoid 54 and the spring return in the valve 32 moves the latter so that the pusher plate 29 is returned to its retracted position, whereupon the limit switch 48 is tripped to release the solenoid 55 in the control valve 32b and the cam plate is moved back to its initial position upon actuation of the spring return in the said valve. Upon reaching its initial position the cam plate actuates the limit switch 50 and energizes a circuit relay 56 by which the circuit is re-set.

Figures 7, 8:
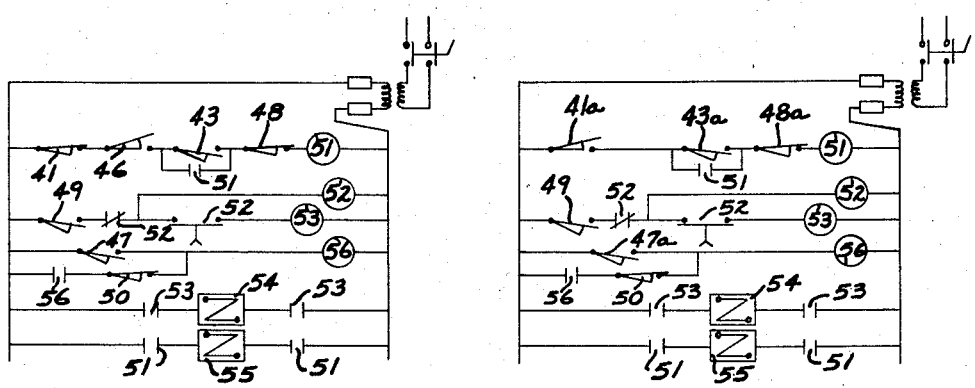
Figure 7 is a wiring diagram showing the electric circuit employed in connection with the stopping, loading and restarting of a pallet.
Figure 8 is a wiring diagram showing the electric circuit employed in connection with the stopping, unloading and restarting of a pallet.

As shown in Figure 8 the circuit employed for unloading is substantially the same as that above described. When the limit switch 41a adjacent an unloading platform 25 is closed by a workpiece on a passing pallet and the adjacent limit switch 43a is also closed by a trip 44, a circuit relay 51 energizes the solenoid 55 in the control valve 32b on the adjacent cam plate platform 26 so that the cam plate 20b thereon is advanced to engage the roller 17 on an approaching pallet 8. When the cam plate reaches its forward limit of travel it trips a limit switch 49 which actuates a timer relay 52 to provide a time interval during which the roller on the approaching pallet enters the cam seat 22b thereon, at which time the pallet is opposite the unloading platform. The timer relay then actuates a circuit relay 53 by which the solenoid 54 in the control valve 32a is energized, and the pusher plate 29a is advanced across the pallet thereby unloading the workpiece thereon onto the rack 30. At that time the pusher plate actuates a limit switch 47a thereby releasing the solenoid 54 and the spring return in the valve 32a moves the latter so that the pusher plate is returned to its initial position. Then the limit switch 48a is tripped to release the solenoid 55 in the control valve 32b and due to operation of the spring return in the latter the cam plate 20b is moved back toward the cylinder 27b. Upon reaching its initial position the cam plates actuates a limit switch 50 and energizes a circuit relay 56 by which the circuit is re-set.

While in the foregoing the preferred embodiment of the invention has been described and shown, it is understood that alterations and modifications may be made thereto provided they fall within the scope of the appended claims.

What I claim is:

1. A free pallet conveyor including a frame, guide means on the frame for supporting an endless chain for movement therealong, said chain having carrier pins projecting at spaced intervals therefrom and extending through a longitudinally extending slot in the upper face of said guide means, tracks on said frame parallel and in spaced relation to the guide means, pallets on the tracks for movement therealong, pallet locking bars mounted on said frame parallel to said tracks and in spaced relation thereabove, a latch pivoted on each pallet, means tending to retain each latch in position to be engaged by one of the carrier pins, whereby its pallet is advanced along the tracks, a lever connected to each latch for turning it clear of the path of movement of the carrier pins, a cam plate mounted for movement transversely of the frame which at its inward position is adapted to coact with the lever on an approaching pallet to turn the latch thereon clear of the path of movement of the carrier pins and stop the approaching pallet, a loading platform extending laterally outward from the frame having a pusher plate mounted for transverse movement thereon, whereby a workpiece on the platform is adapted to be pushed therefrom onto the stopped pallet, an actuating switch mounted on said frame operated by a passing pallet, means connected with said actuating switch for moving the cam plate inward to stop said pallet, means associated with said cam plate for actuating the pusher plate to deliver the workpiece onto the pallet, means associated with said pusher plate for actuating the return of the pusher plate to its initial position, and for returning the cam plate to its initial position to release the latch.

2. The combination in claim 1, including means mounted on said frame for rendering the actuating switch inoperative when the loading platform is empty.

3. The combination in claim 1, including means on said frame for rendering the actuating switch inoperative when the approaching pallet is loaded.

4. The combination in claim 1, wherein the means connected with said actuating switch includes a cylinder having a piston rod extending therefrom for moving the pusher plate, a valve for admitting fluid under pressure into the cylinder, and a relay circuit including means for operating the valves.

5. A free pallet conveyor including a frame, guide means on the frame for supporting an endless chain for movement therealong, said endless chain having carrier pins projecting at spaced intervals therefrom and extending through an elongated slot in the upper surface of said guide means, tracks on said frame parallel and in spaced relation to the guide means, pallets on the tracks for movement therealong, pallet locking bars mounted on said frame parallel to said tracks and in spaced relation thereabove, a latch pivoted from the upper surface of each pallet, means tending to retain each latch in position to be engaged by one of the carrier pins whereby its pallet is adapted to be moved along the tracks, a lever connected to each latch for turning it clear of the path of movement of the carriers, a roller mounted on the end of said lever, cam plates mounted for movement transversely relative to the frame which at their inward positions are adapted to coact with the lever roller of an approaching pallet and turn the latch thereon out of the path of movement of the carrier pins, a loading platform adjacent each cam plate positioned a predetermined distance therefrom and extending laterally relative to the frame, said cam plates and their adjacent loading platforms being relatively so positioned that the pallets are adapted to be stopped opposite the platforms, a pusher plate mounted for transverse movement on each platform for pushing a workpiece thereon onto the arrested pallet opposite to it, an actuating switch mounted on said frame opposite said loading platform adapted to be actuated by a passing pallet, means connected to said actuating switch for moving the cam plate immediately ahead of the loading platform into position to stop said pallet, means associated with said cam plate for moving the pusher plate to push the workpiece on the adjacent loading platform onto the arrested pallet, means associated with said pusher plate for returning the pusher plate to its initial position and for returning the cam plate to its initial position which releases the latch on the stopped pallet, and sensing means mounted on said frame by which emptied pallets are arrested opposite loading platforms, and loaded pallets are caused to travel past loading platforms.

6. A free pallet conveyor including a frame, an endless chain, guide means on the frame for supporting the chain for movement therealong, said chain having carrier pins projecting therefrom at spaced intervals and extending through an elongated slot in the upper surface of said guide means, tracks mounted on said frame parallel and in spaced relation to the guide means, pallets on the tracks for movement therealong, pallet locking bars mounted on said frame parallel to said tracks and in spaced relation thereto, a latch pivoted on each pallet, means adapted to return each latch into position to be-engaged by one of the carrier pins, whereby its pallet is adapted to be moved along the tracks, a lever connected to each latch for turning it clear of the path of movement of the carriers, cam plates mounted for movement transversely of the frame whereby at their inward position they are adapted to coact with the levers on approaching pallets and move the latches thereon clear of the path of movement of the carriers, an unloading platform extending laterally on one side of the frame adjacent each cam plate, said cam plates and their adjacent platforms being relatively so positioned that the pallets are adapted to be stopped opposite the platforms, a pusher plate on each platform mounted for movement across a pallet to push a workpiece off said pallet, an actuating switch on said frame adapted to be actuated by a passing pallet, means connected with said actuating switch for moving the cam plate immediately in front of it into position to stop said pallet, means associated with said cam plate and operating in timed sequence for transversely moving the pusher plate on the adjacent unloading platform to unload the stopped pallet, means associated with said pusher plate for returning the pusher plate to its initial position and for actuating the return of the cam plate to its initial position thereby releasing the latch on the stopped pallet, and means for rendering the actuating switch inoperative with the approaching pallet is empty.

7. A free pallet conveyor including a frame, guide means on the frame for supporting an endless chain for movement therealong, carrier pins projecting at spaced intervals from the chain, tracks on the frame parallel and in spaced relation to the guide means, pallets on the tracks for movement therealong, pallet locking bars mounted on the frame parallel with the tracks and in spaced relation thereover, a latch provided on each pallet, means tending to retain each latch in position to be engaged by one of the carrier pins whereby its pallet is advanced along the tracks, a lever connected to each latch for turning it clear of the path of movement of the carrier pins, a cam plate mounted for movement transversely of the frame which at its inward position is adapted to coact with the lever on an approaching pallet to turn the latch thereon clear of the path of movement of the carrier pins and stop the approaching pallet, an unloading platform extending laterally outward from the frame having a pusher plate mounted for transverse movement thereon, whereby a workpiece on a pallet opposite said unloading platform is adapted to be pushed by said plate from said pallet, an actuating switch mounted on the frame adapted to be operated by a passing pallet, means connected with said actuating switch for moving the cam plate inward to stop the pallet, means associated with the cam plate for actuating the pusher plate to discharge the workpiece from the pallet, and means associated with the pusher plate for actuating the return of said pusher plate to its initial position and for returning the cam plate to its initial position to release the latch.

References Cited in the file of this patent

UNITED STATES PATENTS

| | | |
|---|---|---|
| 2,619,916 | Rainier | Dec. 2, 1952 |
| 2,717,086 | Bush | Sept. 6, 1955 |